US012257560B2

(12) United States Patent
Kawano et al.

(10) Patent No.: US 12,257,560 B2
(45) Date of Patent: Mar. 25, 2025

(54) FLUID MIXING UNIT WITH MEANDERING FLOW THROUGH PARTITIONS OF A POROUS BODY

(71) Applicant: JGC Japan Corporation, Yokohama (JP)

(72) Inventors: Masahiro Kawano, Yokohama (JP); Naoki Tahara, Yokohama (JP); Kiminori Takahashi, Yokohama (JP); Shuichi Oguro, Yokohama (JP)

(73) Assignee: JGC Japan Corporation, Yokohama (JP)

( * ) Notice: Subject to any disclaimer, the term of this patent is extended or adjusted under 35 U.S.C. 154(b) by 360 days.

(21) Appl. No.: 17/270,549

(22) PCT Filed: Apr. 25, 2019

(86) PCT No.: PCT/JP2019/017685
§ 371 (c)(1),
(2) Date: Feb. 23, 2021

(87) PCT Pub. No.: WO2020/217393
PCT Pub. Date: Oct. 29, 2020

(65) Prior Publication Data
US 2022/0032243 A1    Feb. 3, 2022

(51) Int. Cl.
*B01F 25/421* (2022.01)
*B01D 9/00* (2006.01)
(Continued)

(52) U.S. Cl.
CPC ........ *B01F 25/4231* (2022.01); *B01D 9/0054* (2013.01); *B01D 9/02* (2013.01);
(Continued)

(58) Field of Classification Search
CPC .................. B01F 25/3133; B01F 35/60; B01F 2035/351; B01F 2101/2204; B01F 35/602;
(Continued)

(56) References Cited

U.S. PATENT DOCUMENTS 3,045,984 A * 7/1962 Cochran ............. B01F 25/4233
138/42
3,361,412 A * 1/1968 Cole, III ............. B01F 25/4233
261/78.2
(Continued)

FOREIGN PATENT DOCUMENTS

CN        102166489 A    8/2011
CN        207356947 U    5/2018
(Continued)

OTHER PUBLICATIONS

IPER for PCT/JP2019/017685 dated May 2020.*
(Continued)

*Primary Examiner* — Charles Cooley
(74) *Attorney, Agent, or Firm* — Jordan and Koda, PLLC; Steven P. Koda, Esq.

(57) ABSTRACT

A fluid mixing unit includes a cylindrical porous body partitioning a container into a first flow space and a second flow space surrounding the first flow space. A first supply port supplies a first fluid to one of the first and second flow spaces. A second supply port provided on one end side of the container in an axial direction of the cylindrical body supplies a second fluid to the other flow space. An outlet for a mixed fluid is provided on the other end side of the container to be open only to the other flow space. Closing members are provided in a plurality of stages along the axial direction to alternately close a right and a left of the other (Continued)

flow space as seen in the axial direction in the other flow space. A meandering flow is formed in the other flow space to create the mixed fluid.

13 Claims, 13 Drawing Sheets

(51) Int. Cl.
    *B01D 9/02*           (2006.01)
    *B01F 23/451*       (2022.01)
    *B01F 25/00*        (2022.01)

(52) U.S. Cl.
    CPC .. *B01F 23/451* (2022.01); *B01F 2025/91912* (2022.01); *B01F 2025/93* (2022.01); *B01F 2215/0431* (2013.01)

(58) Field of Classification Search
CPC ............ B01F 35/7176; B01F 25/31331; B01F 25/313; B01F 25/4231; B01F 23/451; B01F 2025/91912; B01F 2025/93; B01F 2215/0431; B01F 25/3131; B01F 25/313311; B01F 25/3141; B01F 25/31421; B01F 25/4233; B01F 25/422; B01F 25/421; B01F 25/43172; F04D 13/00; F16L 11/20; F16L 33/18; F16L 39/005; F16L 2201/20; F04B 23/028; B01D 9/0054; B01D 9/02; B01D 9/0036; B01D 9/0059
USPC .......................................................... 366/340
See application file for complete search history.

(56) References Cited

U.S. PATENT DOCUMENTS

| | | | | |
|---|---|---|---|---|
| 3,417,967 | A * | 12/1968 | Richens | B01F 25/43161 366/144 |
| 3,593,964 | A * | 7/1971 | Morane | B01F 25/434 366/340 |
| 3,941,355 | A * | 3/1976 | Simpson | B01F 25/434 261/DIG. 26 |
| 4,123,178 | A | 10/1978 | Salzman et al. | |
| 4,370,062 | A * | 1/1983 | Moody | B01F 25/4316 239/432 |
| 4,412,582 | A * | 11/1983 | Mecozzi | B01F 25/4231 165/162 |
| 4,854,721 | A * | 8/1989 | Hume | B01F 25/434 366/340 |
| 4,869,849 | A * | 9/1989 | Hirose | B01F 25/4523 261/78.2 |
| 4,907,725 | A * | 3/1990 | Durham | B67D 1/0048 366/337 |
| 5,124,035 | A * | 6/1992 | Dunne | B01F 25/43141 210/207 |
| 5,570,822 | A * | 11/1996 | LeMarbe | B67D 1/0048 239/432 |
| 6,447,158 | B1 * | 9/2002 | Farkas | B01F 27/092 366/340 |
| 7,878,705 | B2 * | 2/2011 | Schauerte | B01F 25/45 366/337 |
| 10,814,290 | B2 * | 10/2020 | Bauer | A01K 39/02 |
| 11,857,930 | B2 * | 1/2024 | Kawano | B01D 9/0059 |
| 2001/0050443 | A1 * | 12/2001 | Fitzgeorge | B01F 25/31421 261/122.1 |
| 2003/0150494 | A1 * | 8/2003 | Morgan | B01F 25/421 137/574 |
| 2005/0043546 | A1 | 2/2005 | Brechtelsbauer et al. | |
| 2009/0269250 | A1 | 10/2009 | Panagiotou et al. | |
| 2012/0250449 | A1 | 10/2012 | Nakano | |
| 2013/0163372 | A1 * | 6/2013 | Schneider | B01F 25/102 366/160.1 |
| 2021/0362073 | A1 * | 11/2021 | Kawano | B01D 9/0013 |
| 2022/0032243 | A1 * | 2/2022 | Kawano | B01D 9/0036 |

FOREIGN PATENT DOCUMENTS

| | | | | |
|---|---|---|---|---|
| JP | 52-62773 | A | | 5/1977 |
| JP | 1978116563 | | | 10/1978 |
| JP | 59-93633 | U | | 6/1984 |
| JP | 2-42970 | A | | 2/1990 |
| JP | 1990207829 | A | | 8/1990 |
| JP | 2005-500350 | A | | 1/2005 |
| JP | 2007330894 | A | | 12/2007 |
| JP | 2008104942 | A | | 5/2008 |
| JP | 2008-521595 | A | | 6/2008 |
| JP | 2009136716 | A | | 6/2009 |
| JP | 2011509173 | A | | 3/2011 |
| JP | 2011-98324 | A | | 5/2011 |
| JP | 2012192354 | A | | 10/2012 |
| JP | 2014-4534 | A | | 1/2014 |
| JP | 2015166066 | A | | 9/2015 |
| JP | 2019030834 | A | | 2/2019 |
| WO | WO-2012132990 | A1 * | 10/2012 | ........... B01D 9/0054 |
| WO | WO-2012133736 | A1 * | 10/2012 | ........... B01F 15/024 |
| WO | WO-2014075169 | A1 * | 5/2014 | ........ B01F 15/00162 |
| WO | WO-2020217393 | A1 * | 10/2020 | ........... B01D 9/0036 |

OTHER PUBLICATIONS

English translation of JPA 2015166066, published Sep. 24, 2015.
English translation of JPA 2009136716, published Jun. 25, 2009.
English translation of JPA 2007330894, published Dec. 27, 2007.
English translation of JPA 1990207829, published Aug. 17, 1990.
English translation of JPA 2008104942, published May 8, 2008.
English translation of JPA 2019030834, published Feb. 28, 2019.
English translation of JPA 2011509173, published Mar. 24, 2011.
Machine translation of CN 102166489A.
Machine translation of CN 207356947U.

* cited by examiner

FLUID MIXING UNIT WITH MEANDERING FLOW THROUGH PARTITIONS OF A POROUS BODY

BACKGROUND OF THE INVENTION

The present invention relates to a fluid mixing unit and a fluid mixing method by which a plurality of fluids are mixed in a container to create a mixed fluid.

In a process of producing a pharmaceutical product or the like, a process of mixing a plurality of liquids is performed. One example of the process of mixing is crystallization in which crystals of a target substance are obtained from a raw material liquid. For example, in poor solvent crystallization, a poor solvent that decreases the solubility of a target substance is mixed with a raw material liquid in which the target substance is dissolved, to precipitate crystals of the target substance in a mixed liquid obtained. In addition, in reaction crystallization, a reaction liquid which reacts with a raw material substance to create a target substance having a lower solubility is mixed with a raw material liquid which contains the raw material substance, to precipitate crystals of the target substance.

In the above-described crystallization, a batch production in which after another liquid is dropped onto one liquid contained in a container, the liquids in the container are stirred and mixed to create a large amount of crystals, and the crystals are taken out from inside the container at once to produce a product is performed. However, an apparatus which performs the batch production is configured to perform such steps, so that the apparatus is large in size. Further, the operations of the apparatus, such as charging the liquid into the container and discharging the mixed liquid from which the crystals are precipitated, are complicated. For this reason, according to the batch production, the production cost of the product is increased, which is a concern. Due to such circumstances, in order to reduce the product cost of the product, a conversion to a continuous production in which liquids are continuously mixed to create crystals in small quantity, and the crystals are taken out to continuously produce a product is planned.

In performing such a continuous production, how to perform the above-described mixing is examined. Specifically, when the apparatus is reduced in size in order to suppress the production cost, a pipe through which the liquid flows in the apparatus is reduced in size, so that the pipe diameter is also relatively small. However, when the pipe diameter is small as described above, the loss of pressure received by each liquid flowing through the pipe is large. Further, for the purpose of the continuous production in which production is performed in small quantity, the flow rate of each liquid flowing through the pipe is relatively small.

Namely, it is difficult to increase the flow speed of each liquid flowing in the apparatus, and each liquid flows as a laminar flow through a flow path in the apparatus, so that the laminar flows are unlikely to mix with each other in the flow path. For this reason, even when the liquids are supplied to the flow path (flow space) which is common, and are mixed with each other in the flow path, sufficient mixing cannot be performed, which is a concern. The case of performing crystallization has been described as an example; however, even when a process of mixing liquids other than crystallization (specific examples will be described in the section of the mode for carrying out the invention) is performed, the same problem exists. Incidentally, there is known a device called a static mixer that mixes a plurality of liquids in a flow path. However, even when the static mixer is used, in order to sufficiently mix the liquids, each liquid is required to be supplied to the flow path, in which the static mixer is provided, at a relatively high flow speed to cause a turbulent flow.

By the way, there is a case where in each process of mixing liquids, in order to suppress a rapid reaction between the liquids, the concentration of a second liquid in a first liquid in a mixed liquid is required to increase gradually to suppress a rapid change in concentration. In the related art, liquids are simultaneously supplied from an upstream side of a T-shaped pipe or a Y-shaped pipe which merges such that a downstream side becomes a flow path common to two liquids, so that the mixing of the liquids is performed. However, according to such a mixing method, the liquids flow into the common flow path at once, so that the above-described rapid reaction occurs, which is a concern.

Incidentally, Patent Document 1 describes an apparatus in which a main body 150 which is porous is provided in a container 300, and a large number of supply channels (hole portions) 110 through which a first flow (first fluid) passes, and a large number of sweep channels 210 (hole portions) through which a second flow (second fluid) passes are provided in the main body 150 to be orthogonal to each other. The container 300 is provided with a partition 358 that makes the second flow become a meandering flow in the container 300, and a purge discharge port 2102 that discharges the second flow which has passed through the sweep channels 210. Then, it is described that the first flow which has passed through the supply channels 110 flows out from the container 300 as a second composition 1802, separately from the second flow. Namely, Patent Document 1 also describes that the mixing of the fluids can be performed, but in the apparatus of Patent Document 1, a substance moves between the first flow and the second flow through the main body 150 which is porous, and the first flow and the second flow between which the substance has moved as described above are taken out from a takeout port separately provided in the container 300. Therefore, unlike the invention, two fluids are not mixed and taken out as a mixed fluid, and the configuration is different from that of the invention.

CITATION LIST

Patent Document

Patent Document 1: JP-A-2008-521595 (FIG. 7)

SUMMARY OF THE INVENTION

Technical Problem

The invention has been made in view of such circumstances, and an object of the invention is to provide a technique of being able to reliably mix a plurality of fluids flowing through a flow space to create a mixed fluid, and to perform mixing such that the concentration of the other fluid in one fluid increases gradually.

Solution to Problem

According to an aspect of the invention, there is provided a fluid mixing unit including: a container to which a first fluid and a second fluid each are supplied; a cylindrical body formed of a porous body to partition an inside of the container into a first flow space and a second flow space surrounding the first flow space, and to allow the fluid to move from one flow space of the first flow space and the second flow space to the other flow space; a first supply port provided in the container to supply the first fluid to the one flow space of the first flow space and the second flow space; a second supply port provided on one end side of the container in an axial direction of the cylindrical body to supply the second fluid to the other flow space of the first flow space and the second flow space; an outlet which is provided on the other end side of the container in the axial direction of the cylindrical body so as to be open only to the other flow space of the one flow space and the other flow space, and from which a mixed fluid of the first fluid and the second fluid flows out; and closing members provided in a plurality of stages along the axial direction to alternately close a right and a left of the other flow space as seen in the axial direction in the other flow space, so that a meandering flow of the first fluid and the second fluid is formed in the other flow space to create the mixed fluid.

Advantageous Effects of the Invention

According to the invention, since the inside of the container is partitioned into the first flow space and the second flow space by the cylindrical body formed of a porous body, the fluid is highly uniformly supplied from the one flow space of the first flow space and the second flow space to the other flow space in the axial direction of the cylindrical body. Then, since the closing members which make the flow of the fluid in the axial direction become a meandering flow are provided in a plurality of stages in the other flow space along the axial direction, the contact time for which the fluids are in contact with each other in the second flow space is relatively long, and the fluid supplied to the second flow space through the cylindrical body is stirred by the fluid supplied to the second flow space through the supply port that is open to the second flow space. Therefore, a plurality of the fluids can be reliably mixed to create the mixed fluid, and mixing can be performed such that the concentration of the other fluid in one fluid increases gradually.

DETAILED DESCRIPTION OF PREFERRED EMBODIMENTS OF THE INVENTION

Figure 1:
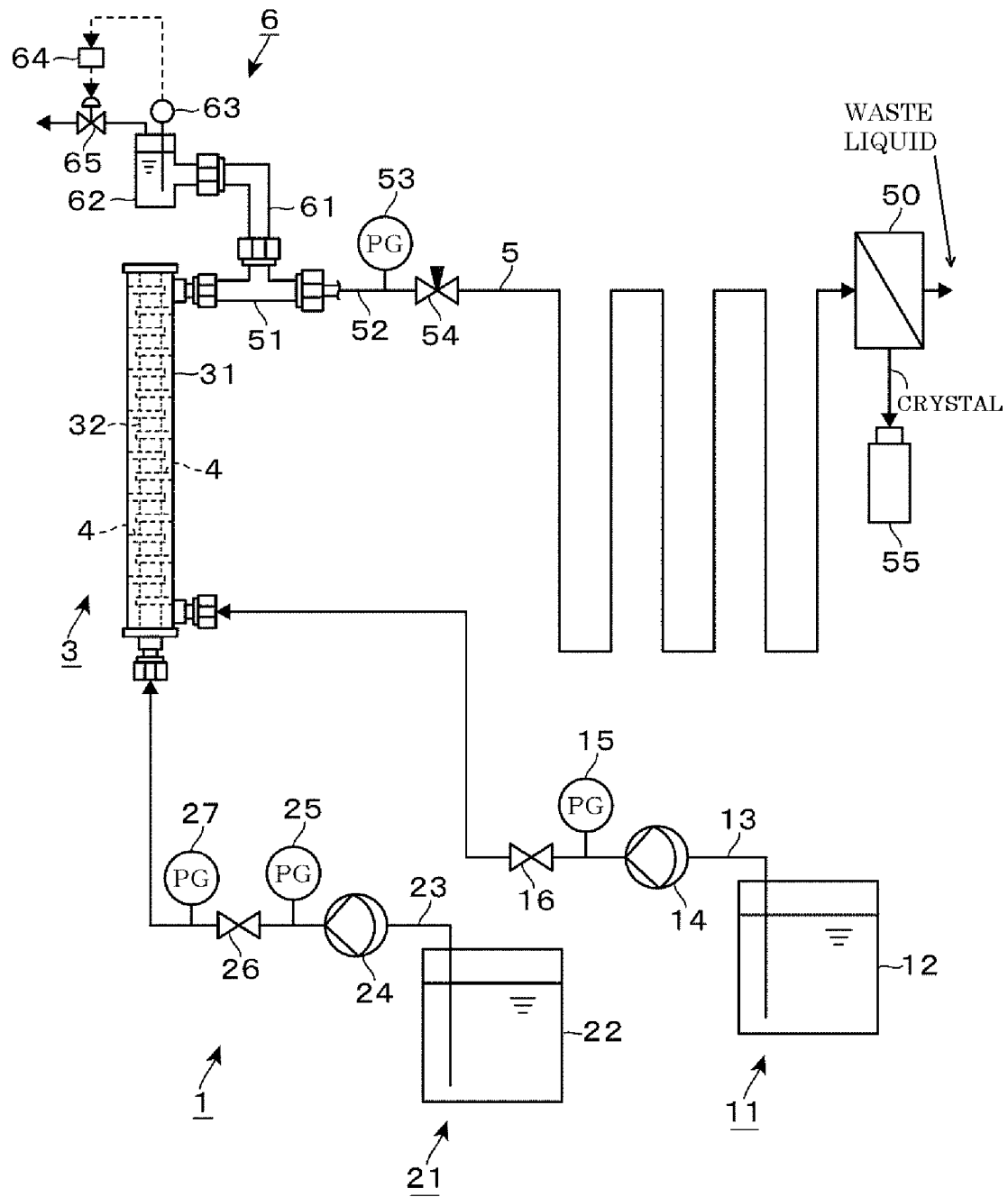
FIG. 1 is a configuration diagram of a crystallizing apparatus including a fluid mixing unit according to a first embodiment of the invention.

FIG. 1 illustrates a crystallizing apparatus 1 including a fluid mixing unit 3 according to a first embodiment of the invention, and the crystallizing apparatus 1 is configured to continuously perform poor solvent crystallization. The crystallizing apparatus 1 includes a raw material liquid supply unit 11, a poor solvent supply unit 21, the fluid mixing unit 3 that mixes a raw material liquid and a poor solvent to create a mixed liquid (mixed fluid), an aging pipe 5 that precipitates crystals of a target substance from the mixed liquid flowing out from the fluid mixing unit 3 to cause the crystals to grow, a solid and liquid separating unit 50 that separates the crystals which have grown in the aging pipe 5, and an exhaust unit 6 that traps and removes bubbles in the mixing liquid toward the aging pipe 5. In addition, the crystallizing apparatus 1 is configured as an upflow type apparatus in which the raw material liquid and the poor solvent each are supplied from a lower portion side of a processing container 31 forming the fluid mixing unit 3, and the mixed liquid flows out from an upper portion side of the processing container 31.

The raw material liquid supply unit 11 includes a raw material liquid tank 12 that stores the raw material liquid, and a raw material liquid supply line 13 that supplies the raw material liquid, which is extracted from the raw material liquid tank 12, to the processing container 31. A diaphragm pump 14, a pressure gauge 15, and an opening and closing valve 16 are provided in the raw material liquid supply line 13 in order from an upstream side. As described in the section of background art, the raw material liquid contains the target substance for crystallization. Incidentally, the raw material liquid may contain fine crystals (seed crystals) of the target substance.

The poor solvent supply unit 21 includes a poor solvent tank 22 that stores the poor solvent, and a poor solvent supply line 23 that supplies the poor solvent, which is extracted from the poor solvent tank 22, to the processing container 31. A diaphragm pump 24, a pressure gauge 25, an opening and closing valve 26, and a pressure gauge 27 are provided in the poor solvent supply line 23 in order from an upstream side.

Figure 2:
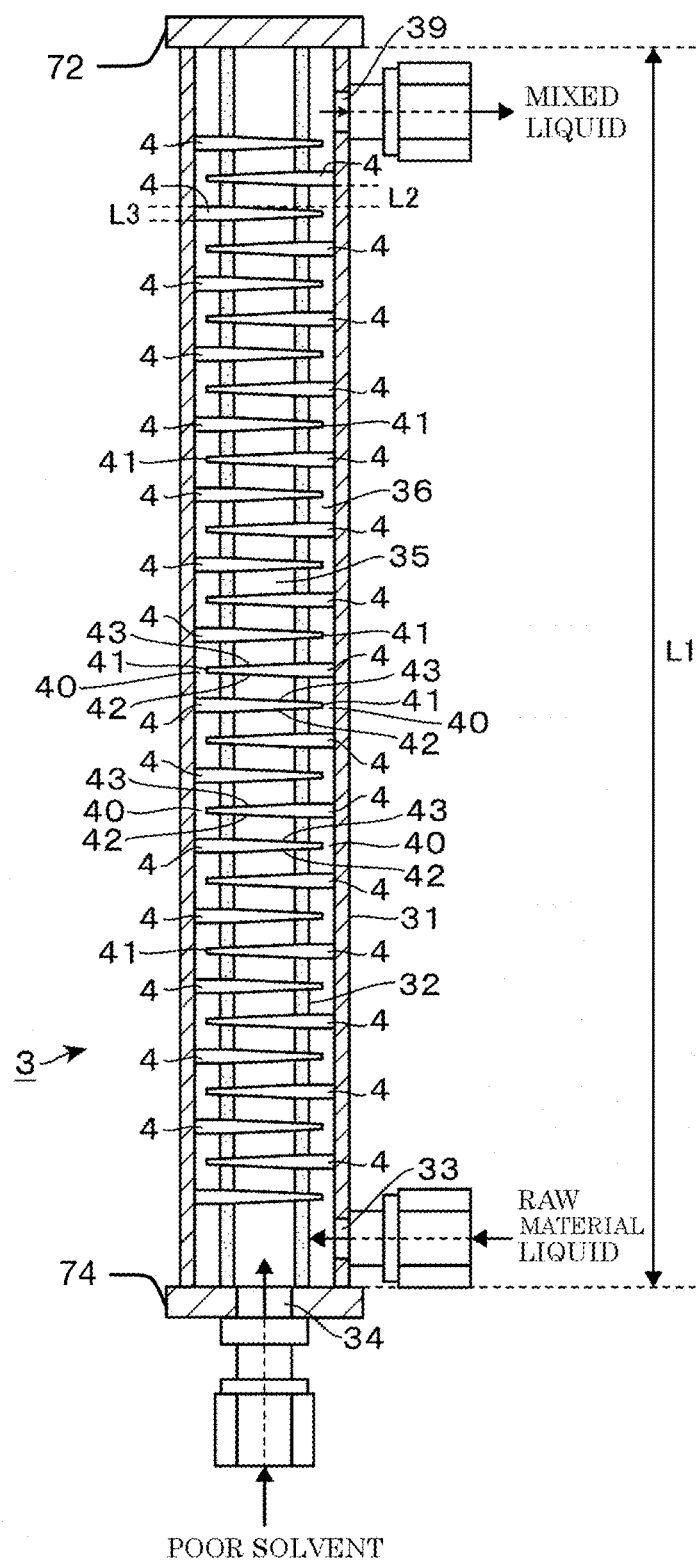
FIG. 2 is a longitudinal sectional side view of the fluid mixing unit.
Figure 3:
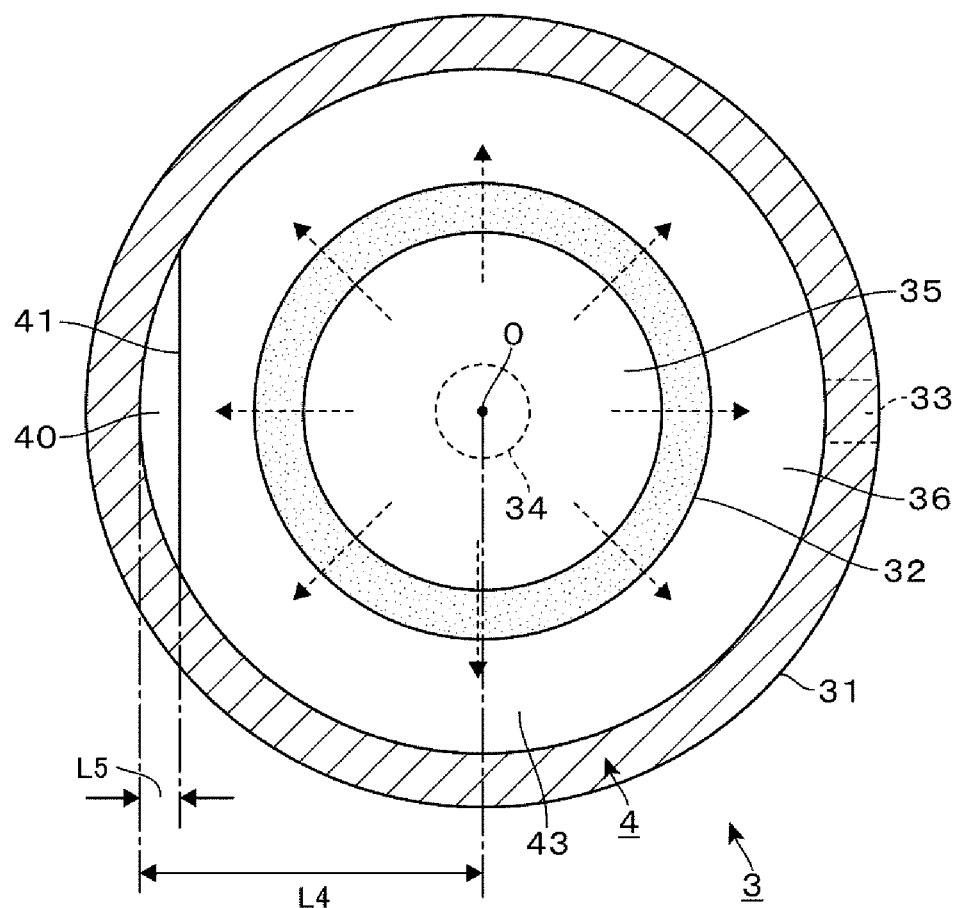
FIG. 3 is a cross-sectional plan view of the fluid mixing unit.

Subsequently, the fluid mixing unit 3 will be described with reference to FIG. 2 which is a longitudinal sectional side view and FIG. 3 which is a cross-sectional plan view. The fluid mixing unit 3 includes the processing container 31, a porous membrane 32, and a large number of baffle plates 4 which are closing members. The processing container 31 is a longitudinally long circular container that stands up vertically from a bottom end 74 to an upper end 72, and in the processing container 31, a side wall supply port 33 is open in a lower end portion of a side wall, and a bottom wall supply port 34 is open in a bottom wall. A downstream end of the raw material liquid supply line 13 is connected to the side wall on the lower portion side of the processing container 31 such that the raw material liquid (second fluid) can be supplied to the side wall supply port 33 which is a second supply port. A downstream end of the poor solvent supply line 23 is connected to a bottom portion of the processing container 31 such that the poor solvent (first fluid) can be supplied to the bottom wall supply port 34 which is a first supply port.

The porous membrane 32 is provided in the processing container 31 as a longitudinal long cylindrical body, and the side wall of the processing container 31 and the porous membrane 32 form a double pipe of which cylinder axes coincide with each other. Incidentally, reference sign O in FIG. 3 denotes the cylinder axis. The porous membrane 32 is provided from a lower end to an upper end of an internal space of the processing container 31, and the porous membrane 32 partitions the internal space into a first flow space 35 and a second flow space 36 that surrounds the first flow space 35. The side wall supply port 33 is open to the second flow space 36, and the bottom wall supply port 34 is open to the first flow space 35.

As the porous membrane 32, a porous membrane made of various materials such as porous glass, porous ceramics, and porous polymers can be used. For example, as the porous membrane 32, a porous membrane having an average pore size in a range of 0.01 to 50 µm can be used. In addition, it is more preferable that a porous membrane having an average pore size in a range of 0.01 to 10 µm is used. The pore size distribution of the porous membrane can be measured, for example, by mercury intrusion porosimetry or a gas adsorption method.

In the crystallizing apparatus 1, the raw material liquid and the poor solvent are supplied to the processing container 31 from the raw material liquid supply unit 11 and the poor solvent supply unit 21 such that the pressure of the first flow space 35 is higher than the pressure of the second flow space 36. Since a pressure difference is formed between the first flow space 35 and the second flow space 36 in such a manner, as indicated by dotted arrows in FIG. 3, the poor solvent flows into the second flow space 36 from the first flow space 35 through pores provided in the porous membrane 32. Since the poor solvent flows into the second flow space 36 in such a manner, as will be described in detail later with reference to FIG. 6, a concentration distribution in which the concentration of the poor solvent in the mixed liquid increases as the mixed liquid approaches an upper side of the second flow space 36 is formed.

Incidentally, the pressure gauge 27 of the poor solvent supply line 23 is used to monitor whether or not the pressure of the first flow space 35 is kept higher than the pressure of the second flow space 36 as described above. In addition, as long as the concentration distribution of the poor solvent in the mixed liquid can be formed, the porous membrane 32 having a larger average pore size than 50 µm can be used. A sintered metal can be provided as an example of the material forming the porous membrane 32 described above.

By the way, an outlet 39 through which the mixed liquid flows out is formed in an upper end portion of the side wall of the processing container 31. Since the outlet 39 is formed at such a position, the outlet 39 is open only to the first flow space 35 of the first flow space 35 and the second flow space 36. Incidentally, since the processing container 31 stands up vertically as described above, an axial direction of the porous membrane 32 which is a cylindrical body is a vertical direction, the side wall supply port 33 and the bottom wall supply port 34 are open on one end side (lower end 74 side) in the axial direction of the processing container 31, and the outlet 39 is open on the other end side (upper end 72 side) in the axial direction of the processing container 31.

Figure 4:
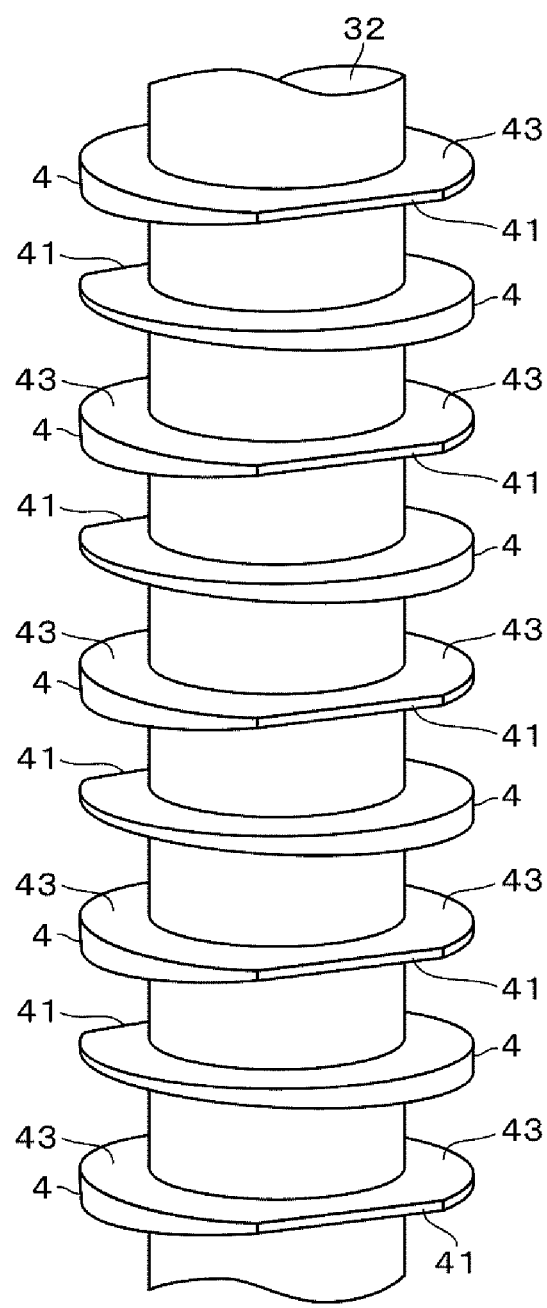
FIG. 4 is a perspective view illustrating the inside of a container forming the fluid mixing unit.
Figure 5:
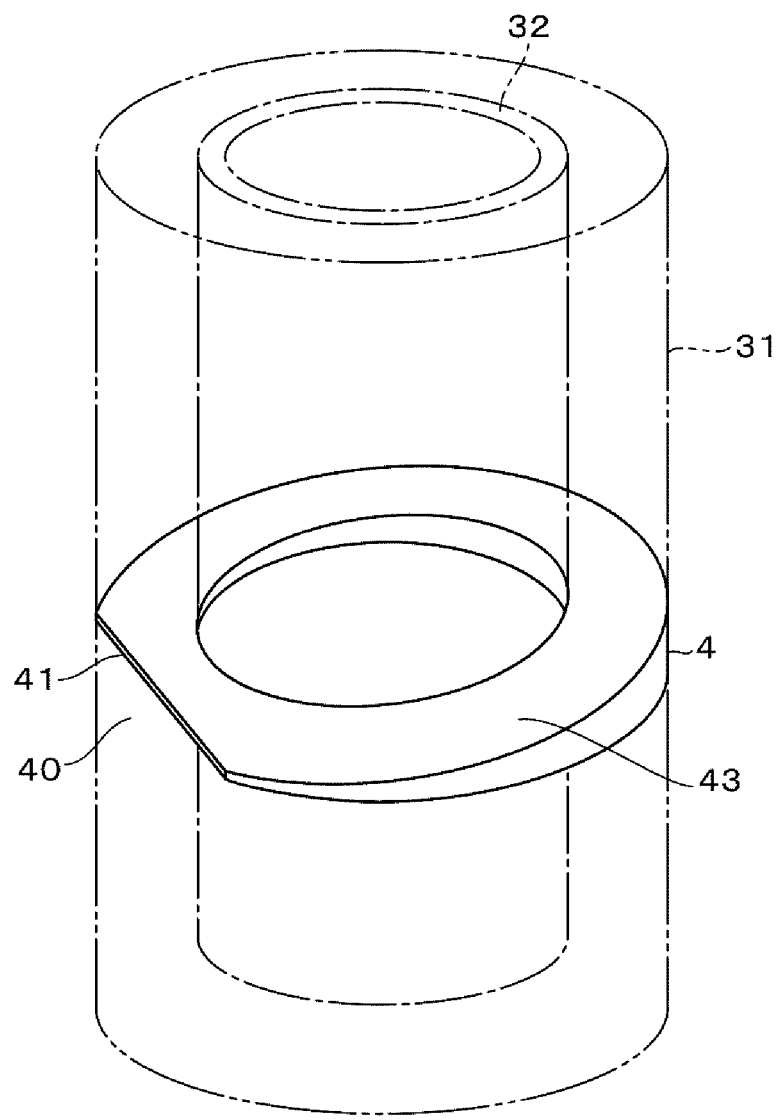
FIG. 5 is a perspective view of a baffle plate provided inside the container.
Figure 6:
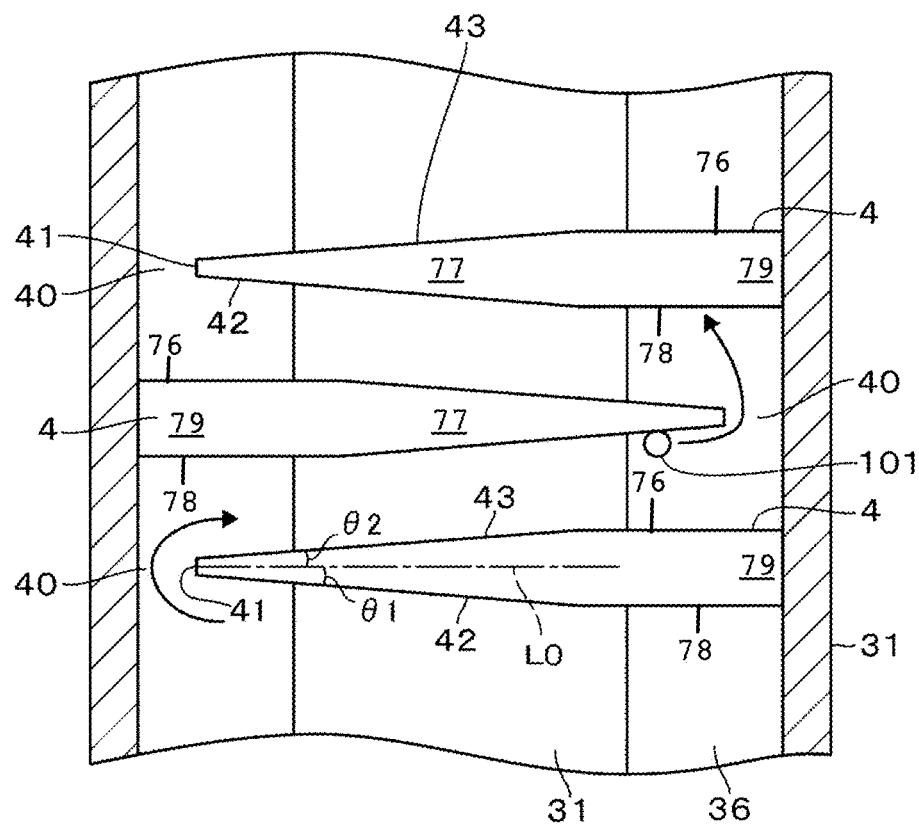
FIG. 6 is a side view of the baffle plate.

Subsequently, the baffle plate 4 provided in the processing container 31 will be described with reference to FIGS. 4 to 6. FIGS. 4 and 5 are perspective views of the baffle plate 4, and FIG. 6 is a side view of the baffle plate 4. Each of the baffle plates 4 is an annular member, more specifically, has a shape of which an end portion is cut out along a string connecting two points on an annular outer periphery. Reference sign 41 in the figure is a side wall of the cutout portion, and a gap 40 is formed between an inner wall of the processing container 31 and the side wall. The baffle plates 4 are disposed at equal intervals from each other, and are provided in multiple stages along the axial direction (vertical direction) of the porous membrane 32 which is a cylindrical body. Then, when seen in the axial direction, the baffle plate 4 closes one or the other of the right and the left of the second flow space 36. In addition, when seen in the axial direction, the baffle plates 4 are disposed to alternately close the one and the other of the right and the left of the second flow space 36, and a flow path of a meandering flow is formed in the second flow space 36.

The right and the left of the second flow space 36 are the right and the left of the baffle plate 4. On the right and the left of the baffle plate 4, a side on which a side wall 41 is provided and the second flow space 36 is not closed is an open side, and a side which is opposite to the open side and on which the second flow space 36 is closed is a closed side. The thickness of the baffle plate 4 increases as the baffle plate 4 extends from an end portion 77 on the open side toward an end portion 79 on the closed side. More specifically, the baffle plate 4 is symmetrical in the vertical direction in a side view, and includes a lower surface (i.e., first transverse surface 78 and lower inclined surface 42) that gradually approaches a lower side (one end side of the processing container 31) as the lower inclined surface 42 extends from the open side toward the closed side, and an upper surface (i.e., second transverse surface 76 and upper inclined surface 43) that gradually approaches an upper side (the other end side of the processing container 31) as the upper inclined surface 43 extends from the open side toward the closed side.

The reason the lower inclined surface 42 and the upper inclined surface 43 are provided in such a manner will be described. It is conceivable that an bubble 101 is contained in the raw material liquid to be supplied from the raw material liquid supply unit 11 to the second flow space 36 (refer to FIG. 6). The bubble 101 moves along a lower surface of the baffle plate 4 due to the buoyancy of the bubble 101 and pressure received from a liquid flow in the second flow space 36, and the lower surface is formed as the lower inclined surface 42, so that as indicated by a solid arrow in FIG. 6, the bubble 101 is guided by the lower inclined surface 42 to be easily discharged upward. Therefore, it can be prevented that the volume of the liquid in the second flow space 36 is reduced by the volume of the bubble 101 and the mixing of the liquids is unlikely to occur. When the Reynolds number of the liquid in the second flow space 36 is a low value as will be described later, the bubble 101 is relatively difficult to be swept away by the liquid flow. Therefore, in order to promote the discharge of the bubble 101, it is particularly preferable that the lower inclined surface 42 described above is provided.

In addition, the poor solvent flows into the second flow space 36 from the first flow space 35 through the porous membrane 32 as described above, and the poor solvent which has flown out to the second flow space 36 in such a manner is guided by the lower inclined surface 42 and the upper inclined surface 43 to flow to the upper side. Therefore, the flow of the poor solvent is suppressed from stagnating around the baffle plate 4, and the mixing of the poor solvent with the raw material liquid is more efficiently performed.

In FIG. 6, a horizontal plane (plane orthogonal to a cylinder axis O) is denoted by reference sign L0. The inclination of the lower inclined surface 42 and the upper inclined surface 43 with respect to a horizontal plane L0 is steeper on the open side than on the closed side. In addition, in FIG. 6, the angles formed with respect to the horizontal plane L0 by end portions 77 on the open side of the lower inclined surface 42 and the upper inclined surface 43 are 1 and 2. When the angles 1 and 2 are too large, the thickness of the baffle plate 4 becomes large, so that a sufficient number of the baffle plates 4 cannot be disposed in the second flow space 36. For this reason, it is preferable that the angles 1 and 2 are set to, for example, 0 to 40.

By the way, as will be described in detail later, the baffle plates 4 lengthen and narrow the flow path in the processing container 31, so that the mixing of the raw material liquid and the poor solvent in the second flow space 36 is promoted. From the point of view, as illustrated in FIG. 2, when the length in the axial direction of the internal space of the processing container 31 is L1, the interval between the baffle plates 4 adjacent to each other is L2, and the thickness of an end portion 79 on the closed side of the baffle plate 4 is L3, it is preferable that, for example, L2/L1 is set to 0.1 or less, for example, L3/L1 is set to 0.1 or less, and the number of the baffle plates 4 provided in the processing container 31 is 10 or more. Incidentally, when the description of the interval L2 described above is supplemented, the interval L2 is an interval in the axial direction between ends on the closed side of the baffle plates 4. In addition, from the point of view of lengthening and narrowing the flow path as described above, as illustrated in FIG. 3, when the distance between the cylinder axis O and the inner wall of the processing container 31 is L4, and the width of the gap 40 when seen in a cylinder axis direction (distance between a point that equally divides the string and a point that equally divides an arc) is L5, it is preferable that L5/L4 is 1 or less.

Returning to FIG. 1, a configuration of each part of the crystallizing apparatus 1 other than the fluid mixing unit 3 will be described. The mixed liquid which has flown out from the outlet 39 is supplied to a T-shaped joint 51 provided in the side wall on the upper portion side of the processing container 31. The T-shaped joint 51 is connected to a line 52. A pressure gauge 53 and a needle valve 54 are provided in the line 52 in order from an upstream side. A downstream side of the needle valve 54 in the line 52 is formed as the aging pipe 5, and the aging pipe 5 has a role of allowing the mixed liquid to flow therethrough until crystals of the target substance are precipitated from the mixed liquid of the raw material liquid and the poor solvent to grow to a desired crystal size. Then, a downstream end portion of the aging pipe 5 is provided with the solid and liquid separating unit 50. The solid and liquid separating unit 50 is formed of, for example, a combination of a filter for separation of a solid and a liquid and an aspirator, and separates the mixed liquid into crystals and a waste liquid. Reference sign 55 in the figure is a receiving container that contains the crystals which are separated.

Subsequently, the exhaust unit 6 will be described. The exhaust unit 6 includes a gas and liquid separating unit 62 which is a container connected to a branch pipe 61 branching from a side surface of the T-shaped joint 51, a liquid level gauge 63 that is configured as, for example, an ultrasonic level sensor to measure a liquid level (height of an interface between a gas pool and the liquid) in the gas and liquid separating unit 62, and a valve controller 64 that opens and closes a degassing valve 65 based on a detection result of the liquid level by the liquid level gauge 63. The bubble 101 which has been released from the outlet 39 to flow into the gas and liquid separating unit 62 is trapped by the gas and liquid separating unit 62 to form a gas pool. When the liquid level detected by the liquid level gauge 63 is a liquid level set in advance or less, the valve controller 64 is configured to cause the degassing valve 65 to be opened to discharge the gas in the gas pool to the outside.

Figure 7:
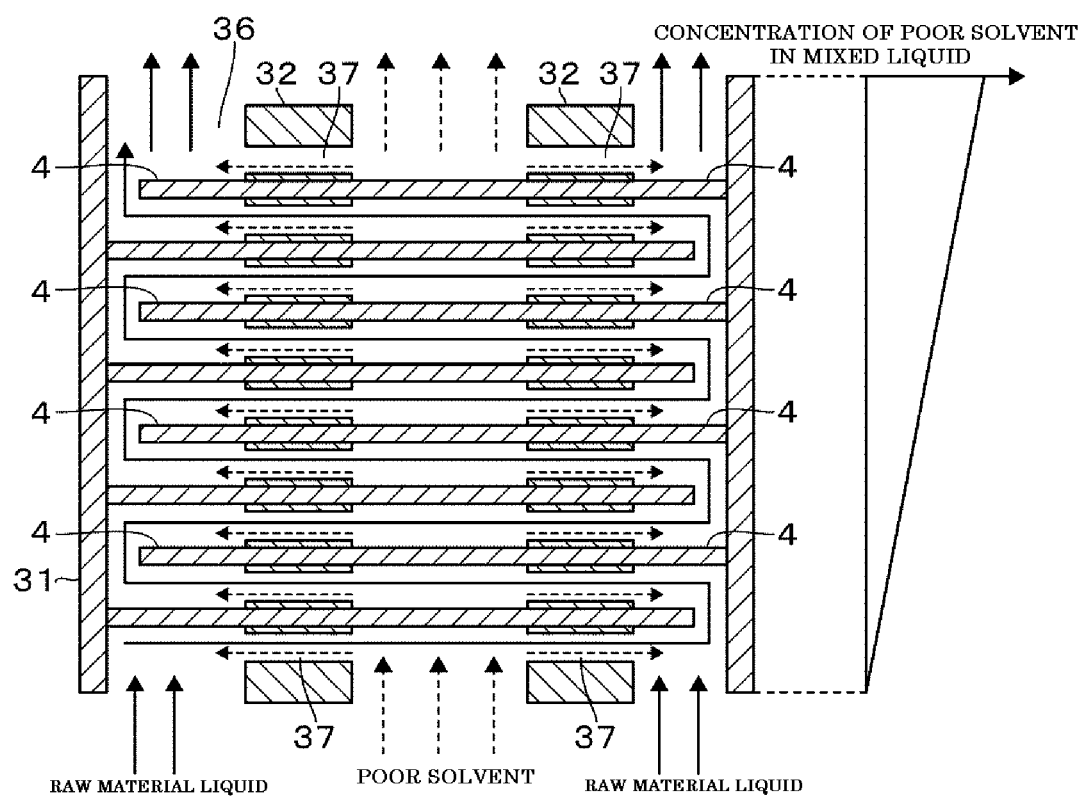
FIG. 7 is a schematic view illustrating the flow of each liquid inside the container.

Subsequently, the operation of the crystallizing apparatus 1 will be described with reference to FIG. 7 in which the flow of the raw material liquid and the flow of the poor solvent in the processing container 31 are indicated by solid arrows and dotted arrows, respectively. First, the opening and closing valves 16 and 26 are opened, and the diaphragm pumps 14 and 15 are driven to continuously supply the raw material liquid in the raw material liquid tank 12 to the second flow space 36 through the side wall supply port 33 at a predetermined flow rate, and to continuously supply the poor solvent in the poor solvent tank 22 to the first flow space 35 at a predetermined flow rate.

Each of the Reynolds number of the poor solvent flowing through the first flow space 35 and the Reynolds number of the raw material liquid flowing through the second flow space 36 is, for example, 2,000 or less. Due to such a Reynolds number, each of the poor solvent flowing through the first flow space 35 and the raw material liquid flowing through the second flow space 36 is a laminar flow. The raw material liquid and the poor solvent are supplied such that the pressure of the first flow space 35 is higher than the pressure of the second flow space 36, and the poor solvent from the first flow space 35 flows into the second flow space 36 through pores 37 provided in the porous membrane 32.

Since the baffle plates 4 are provided, the flow path from the bottom wall supply port 34 to the outlet 39 in the second flow space 36 is formed to be relatively long. Therefore, the raw material liquid and the poor solvent are in contact with each other for a relatively long time from when flowing into the processing container 31 until flowing out therefrom. In addition, owing to the baffle plates 4, the raw material liquid flows to the right and the left of the porous membrane 32 in a meandering manner, so that an operation of stirring the poor solvent flowing out from the porous membrane 32 can be obtained. Further, since the height of the flow path in the second flow space 36 is relatively small, the flow path being formed between the baffle plates 4 in an interposed manner, as compared to when the baffle plates 4 are not provided, the flow speed of the raw material liquid and the poor solvent flowing through the second flow space 36 is higher, and the above-described operation of stirring is relatively stronger. Due to these factors, the mixing of the raw material liquid and the poor solvent proceeds efficiently. Since the mixing of the raw material liquid with the poor solvent is performed as described above, the solubility of the target substance contained in the raw material liquid decreases. Incidentally, a certain amount of time is required to elapse from when the concentration of the target substance in the mixed liquid is saturated due to the mixing of the poor solvent until the precipitation of crystals of the target substance starts, and the time is called an induction time.

In addition, a large number of the pores 37 in the porous membrane 32 are highly uniformly distributed in a plane of the porous membrane 32. For this reason, the poor solvent flows into the second flow space 56 from each position in the plane of the porous membrane 32 substantially at the same flow speed, and the above-described mixing is performed. Therefore, from the point of view of the raw material liquid flowing upward in a meandering manner, the poor solvent is gradually supplied. As a result, as shown in a graph also illustrated in FIG. 7, a concentration distribution in which the average concentration of the poor solvent in the mixed liquid at each height position in the second flow space 56 continuously increases from the lower portion side toward the upper portion side is formed (FIG. 7 illustrates an example in which the concentration of the poor solvent increases proportionally).

The mixed liquid created in the second flow space 36 as described above continuously flows out from the outlet 39 to be supplied to the aging pipe 5 through the line 52 and the needle valve 54. Then, in a process where the mixed liquid flows through the aging pipe 5, the induction time elapses, and the crystals of the target substance are precipitated to grow. The mixed liquid is supplied to the solid and liquid separating unit 50, and the crystals of the target substance are separated from the liquid to be contained in a receiving container 55. The liquid from which the crystals are separated is treated as a waste liquid. Incidentally, when the clogging of the needle valve 54 in the line 52 occurs due to the precipitated crystals of the target substance, the clogging is detected as an increase in pressure of the pressure gauge 53, so that the operation of the diaphragm pumps 14 and 24 stops. In addition, in the process in which the mixed liquid is supplied to the aging pipe 5 in such a manner, bubbles flow into the gas and liquid separating unit 62 to form a gas pool. Then, when the liquid level detected by the liquid level gauge 63 is the level set in advance or less, the degassing valve 65 is opened as described above, and the gas in the gas and liquid separating unit 62 is discharged to the outside.

Since the fluid mixing unit 3 is used as described above, the raw material liquid and the poor solvent can be reliably mixed to flow out from the outlet 39 as the mixed liquid, and mixing can be performed such that the concentration of the poor solvent in the raw material liquid flowing through the second flow space 36 toward the outlet 39 increases gradually. Therefore, when there occurs a problem such as deterioration of the properties of the crystals to be created, for example, due to a rapid increase in concentration of the poor solvent in the raw material liquid, the fluid mixing unit 3 can be preferably used.

Incidentally, in the above description, an operation of "continuously supplying" the raw material liquid and the poor solvent also includes a case where the supply of the fluids at a predetermined flow rate and the stop of supply of the fluids or an increase and decrease in amount of supply is intermittently repeated, in addition to a case where the fluids are continuously supplied at a constant flow rate. In addition, the expression that the mixed liquid "continuously flows out" also includes a case where outflow at a predetermined flow rate is generated and an outflow is stopped or an increase and decrease in amount of outflow is intermittently repeated at regular intervals, in addition to a case where the mixed liquid continuously flows out at a constant flow rate.

By the way, in an apparatus including a pipe having, for example, a pipe diameter of several tens of mm, it is assumed that a plurality of liquids flow through the pipe at a relatively low flow rate and the mixing of the liquids is performed. In that case, the Reynolds number of the liquid in the pipe may be as small as several tens. In the apparatus, if the flow speed of each of the liquids can be increased, it is conceivable to obtain a mixed liquid in such a manner that the flow speed is increased to form a turbulent flow thus to mix the liquids and the mixed liquid is received in a buffer tank. However, since the fluid mixing unit 3 is used, it is not necessary to form such a turbulent flow or provide the buffer tank. Therefore, since the fluid mixing unit 3 is used, there is an advantage in performing the mixing of the liquids or being able to simplify the configuration of the apparatus. Incidentally, as described in the section of background art, there is a case where the flow speed of each of the liquids cannot be increased due to the configuration of the apparatus, and in that case, it is particularly effective to use the fluid mixing unit 3 in performing the mixing of the liquids. In addition, in the apparatus that performs batch production described in the section of background art, the container is provided with a stirring mechanism for stirring the liquids supplied into the container. However, since the fluid mixing unit 3 does not require such a stirring mechanism in mixing the liquids, also from the point of view, when the fluid mixing unit 3 is used, the configuration of the apparatus can be simplified.

In addition, there is known a device called a microreactor including a very small T-shape or Y-shaped flow path which branches on an upstream side and merges on a downstream side. Two liquids are separately supplied to the upstream side, and due to capillary phenomenon, the liquids automatically flow to the downstream side and come into contact with each other to merge. However, according to mixing by the microreactor, as described in the section of background art, the concentration of the other liquid in one liquid increases rapidly, and since the flow path is very small to cause the capillary phenomenon to function, there is limit to the flow rate of the liquid which can be supplied. The fluid mixing unit 3 may be used instead of the microreactor, and in that case, there are advantages such as being able to prevent the above-described concentration from increasing rapidly, and increasing the degree of freedom in the flow rate of the liquid which can be supplied.

Figure 8:
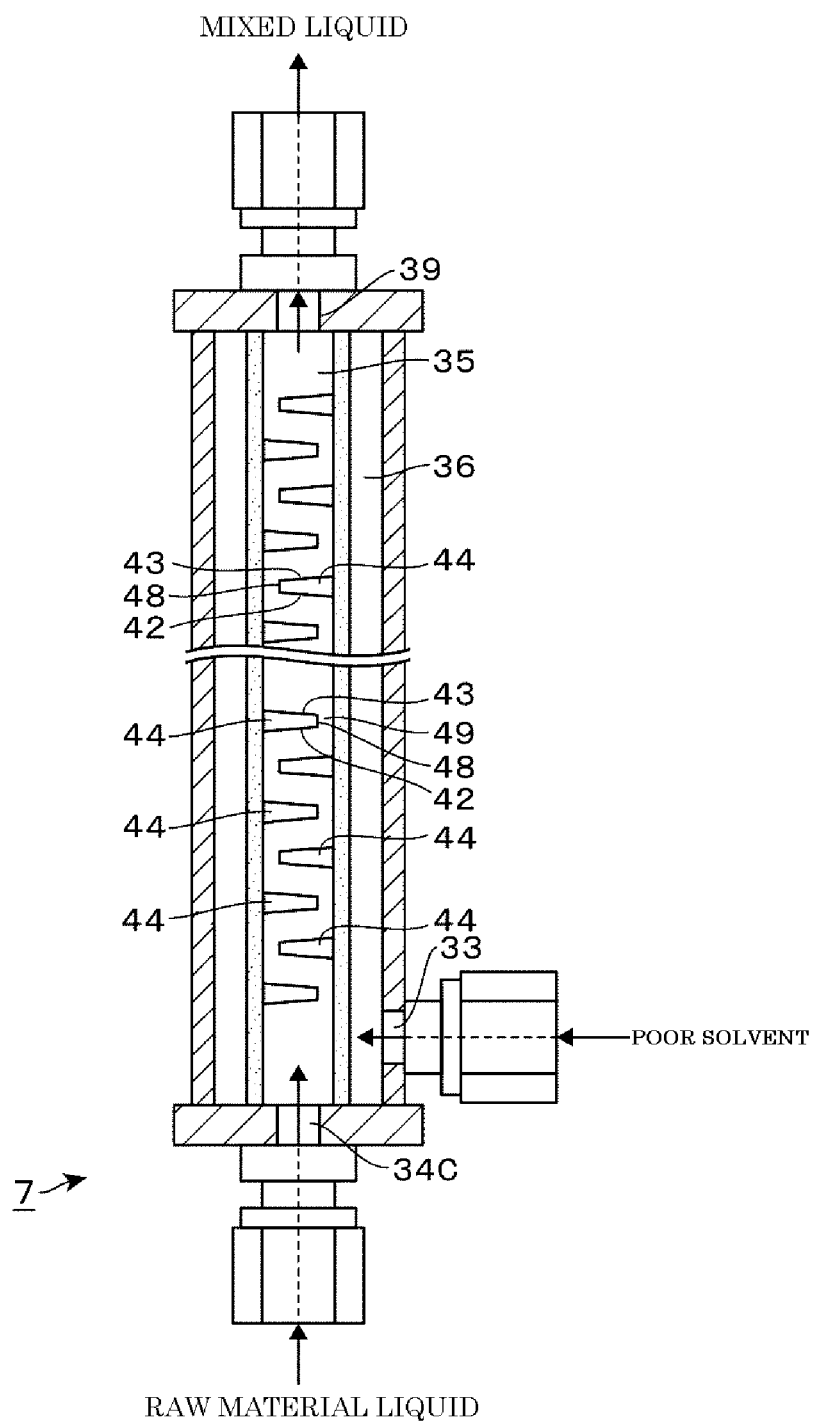
FIG. 8 is a longitudinal sectional side view of a fluid mixing unit according to a second embodiment.
Figure 9:
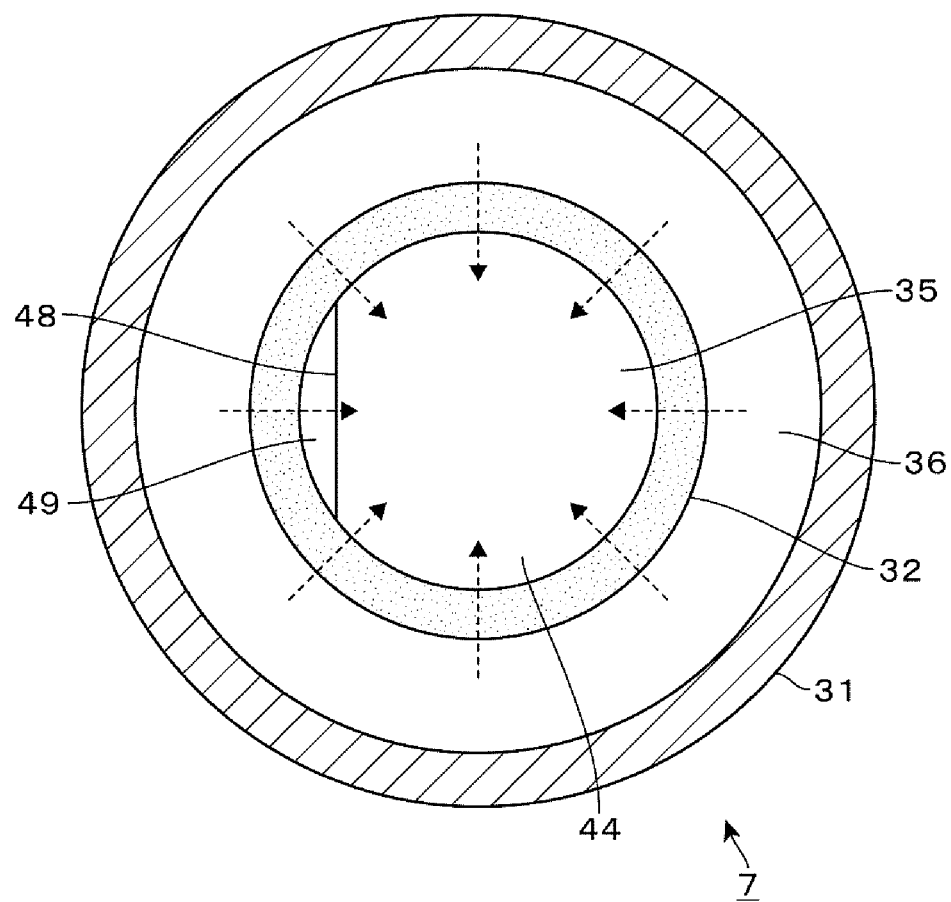
FIG. 9 is a cross-sectional plan view of the fluid mixing unit according to the second embodiment.

Subsequently, the points of difference of a fluid mixing unit 7 according to a second embodiment compared to the fluid mixing unit 3 will be mainly described with reference to FIG. 8 which is a longitudinal sectional side view and FIG. 9 which is a cross-sectional plan view. In the fluid mixing unit 7, instead of providing the baffle plate 4 in the second flow space 36, a baffle plate 44 is provided in the first flow space 35. A meandering flow is formed in the first flow space 45 of the fluid mixing unit 7 by the baffle plate 44. In addition, the outlet 39 is provided in a ceiling portion of the processing container 31, and is open only to the first flow space 35 of the first flow space 35 and the second flow space 36. Then, the raw material liquid supply line 13 is connected to the bottom wall supply port 34 of the processing container 31, and the poor solvent supply line 23 is connected to the side wall supply port 33 of the processing container 31.

The baffle plate 44 is formed in substantially a circular shape, more specifically, has a shape in which an end portion of a circle is cut along a string connecting two points on a periphery. Reference sign 48 in the figure is a side wall of the portion that is cut out in such a manner, and reference sign 49 is a gap between a side wall 48 and the porous membrane 32. Similar to the baffle plate 4, the thickness of the baffle plate 44 increases as the baffle plate 44 extends from an open side (side on which the side wall 48 is provided) toward a closed side (side opposite to the side on which the side wall 48 is provided), so that the baffle plate 44 includes the lower inclined surface 42 and the upper inclined surface 43. Then, similar to the baffle plate 4, the baffle plate 44 are provided in multiple stages in the axial direction of the cylindrical body of the porous membrane 32, and are disposed to alternately close one and the other of the right and the left of the baffle plates 44 when seen along the axial direction.

The raw material liquid and the poor solvent are supplied such that the pressure in the first flow space 35 is lower than the pressure in the second flow space 36, and owing to the baffle plates 44, the raw material liquid flows upward while meandering rightward and leftward in the first flow space 35. Meanwhile, the poor solvent is highly uniformly supplied from each part of an inner peripheral surface of the porous membrane 32 to the first flow space 35. Incidentally, dotted arrows in FIG. 9 indicate the flow of the poor solvent. Similar to a case where the baffle plates 4 are provided in the second flow space 36 described above, since the baffle plates 44 are provided, the time of contact between the raw material liquid and the poor solvent increases, and stirring performance is improved, so that mixing can be efficiently performed and the mixed liquid created can flow out from the outlet 39. In addition, since the poor solvent is supplied to the first flow space 35 through the porous membrane 32 as described above, the poor solvent is gradually supplied to the raw material liquid flowing toward the outlet 39, and the average concentration of the poor solvent in the mixed liquid at each height position in the first flow space 35 continuously increases from the lower portion side toward the upper portion side. Namely, the fluid mixing unit 7 also has the same effect as that of the fluid mixing unit 3.

For convenience of description, a case where poor solvent crystallization is performed has been described; however, the present technique may be applied to reaction crystallization, and is not limited to being applied only to crystallization. For example, when a large amount of one liquid and another liquid are mixed at once to cause the liquids to react rapidly with each other, thus resulting in a dangerous state such as the occurrence of heat generation or the like or solidification, the fluid mixing unit 3 or 7 is used, so that such heat generation or solidification can be suppressed. The present technique can be applied to, for example, when water as one liquid and sulfuric acid as another liquid are mixed, so that excessive heat generation and bumping are prevented. In addition, there is a case where an alkaline aqueous solution (for example, NaOH) is supplied as a pH adjuster to adjust the pH of a raw material liquid containing protein in continuous production of pharmaceutical products. For example, when the alkaline aqueous solution is dropped, through a pipe, onto the raw material liquid stored in a container, the pH changes locally and rapidly at the position where the alkali is dropped in a liquid pool of the raw material liquid in the container, and the protein in the raw material liquid are denaturized to cause a deterioration in quality of the product, which is a concern. However, when the fluid mixing unit 3 or 7 is used, such a rapid change in pH is suppressed, so that a deterioration in quality of the product can be suppressed.

Figure 10:
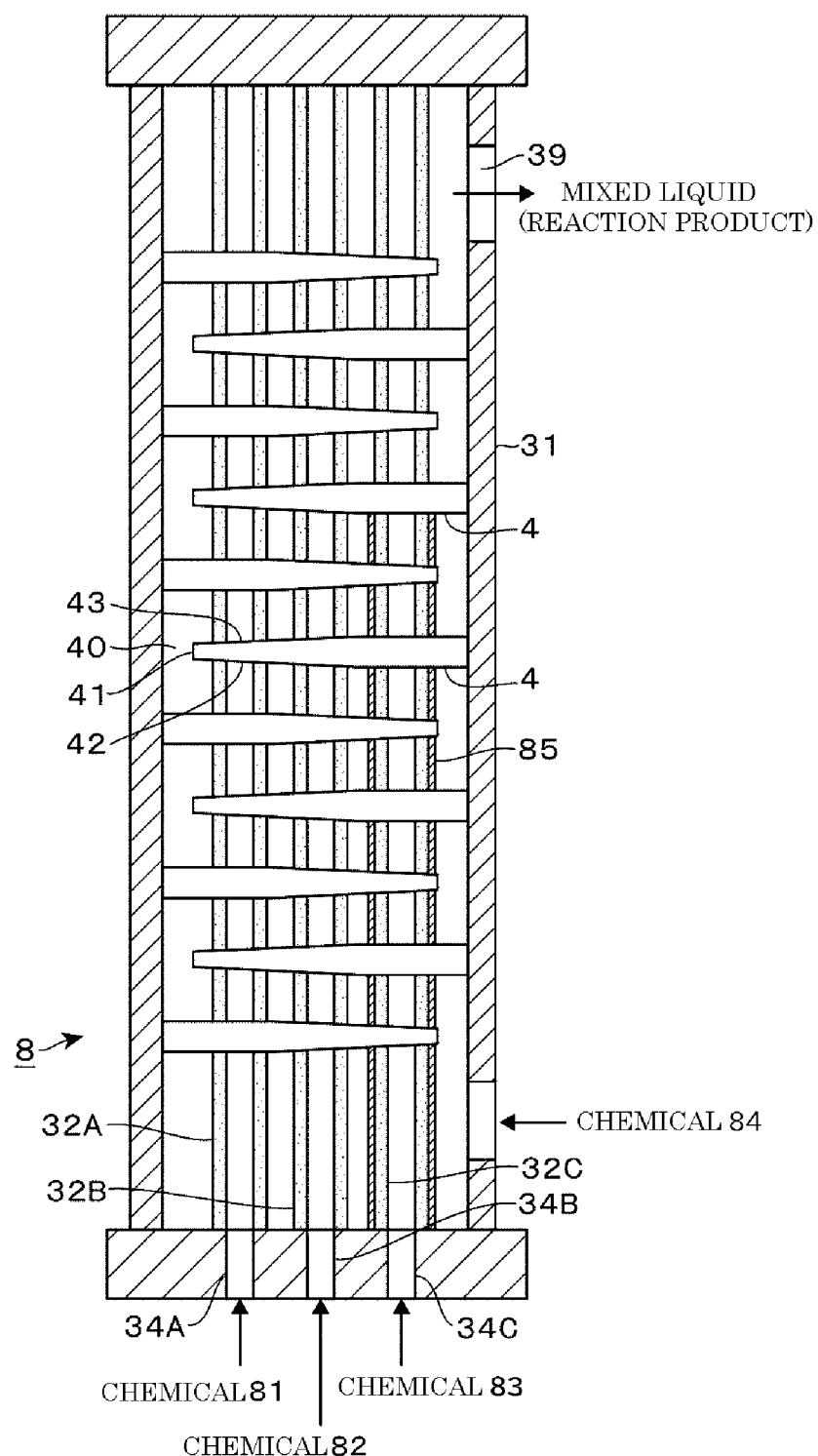
FIG. 10 is a longitudinal sectional side view of a fluid mixing unit according to a third embodiment.
Figure 11:
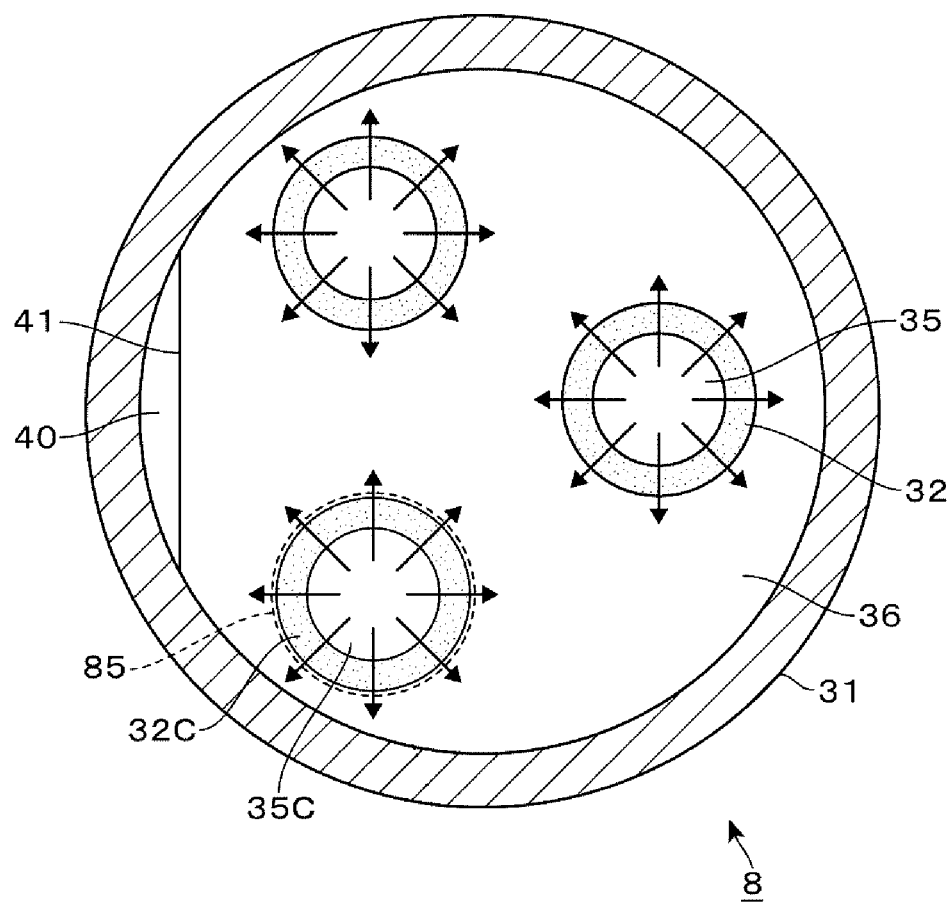
FIG. 11 is a cross-sectional plan view of the fluid mixing unit according to the third embodiment.
Figure 12:
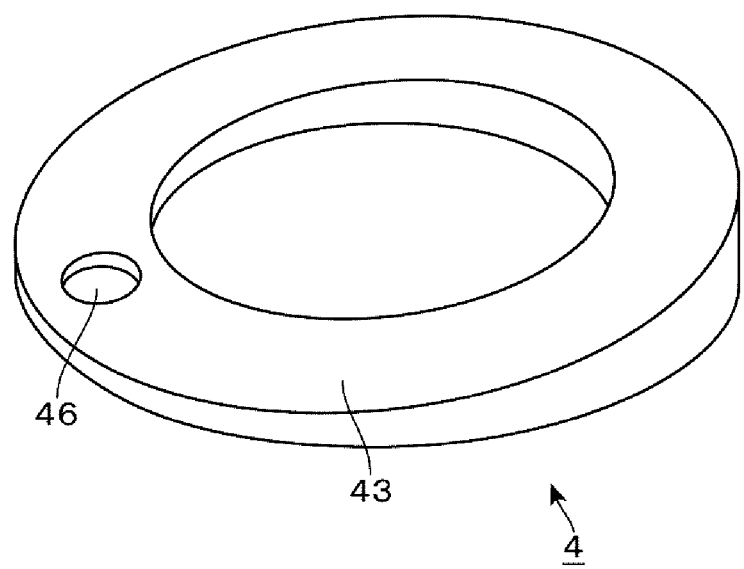
FIG. 12 is a plan view illustrating another configuration example of the baffle plate.

Subsequently, the points of difference of a fluid mixing unit 8 according to a third embodiment compared to the fluid mixing unit 3 will be mainly described with reference to FIG. 10 which is a longitudinal sectional side view and FIG. 11 which is a cross-sectional plan view. As the points of difference of the fluid mixing unit 8 compared to the fluid mixing unit 3, porous membranes 32A, 32B, and 32C, first flow spaces 35A, 35B, and 35C, and bottom wall supply ports 34A, 34B, and 34C are provided, and the porous membranes 32A to 32C are provided to penetrate through the baffle plates 4. With such a configuration, different liquids can be supplied to the first flow spaces 35A, 35B, and 35C, respectively, and the liquids can be supplied to the second flow space 36 through the porous membranes 32A, 32B, and 32C, respectively.

For example, chemicals 81, 82, and 83 which are liquids are supplied from the bottom wall supply ports 34A, 34B, and 34C, respectively, and a chemical 84 which is a liquid is supplied from the side wall supply port 33. Then, a liquid which is a reaction product of the chemicals 81 to 84 flows out from the outlet 39. Reference sign 85 in the figure is a film that covers a lower portion side of the porous membrane 32C, and the chemical 83 does not flow out from a portion covered with a film 85. Therefore, the chemical 84 reacts with the chemical 81 and the chemical 82, and then reacts with the chemical 83. As described above, the order of reactions in the second flow space 36 can be adjusted by the film 85. Similar to the fluid mixing unit 3, also in the fluid mixing unit 8, the mixing of the chemicals 81 to 84 can be reliably performed by the operation of the baffle plates 4. Then, the chemicals 81 to 83 can be gradually supplied to the chemical 84 flowing through the second flow space 36, to be mixed therewith.

Figure 13:
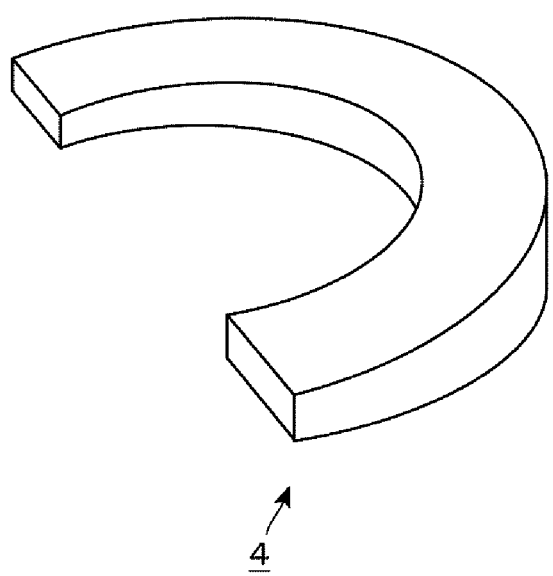
FIG. 13 is a plan view illustrating another configuration example of the baffle plate.

By the way, as long as the baffle plates of the fluid mixing unit 3 of the first embodiment alternately close the right and the left in the processing container 31, the baffle plates are not limited to the baffle plates 4 described above. For example, instead of providing the cutout to form the gap 40, a through-hole 46 which penetrates through the baffle plate in the thickness direction may be provided. In addition, the baffle plate is not limited to being formed as an annular member, and may be formed in an arch shape as illustrated in FIG. 13. However, when the flow path of the meandering flow is lengthened as described above, the mixing of the liquids can be more reliably performed. From the point of view, it is preferable that the baffle plate is formed as an annular member and includes a cutout similar to the baffle plate 4. Incidentally, the baffle plate provided in the fluid mixing unit 7 of the second embodiment is also not limited to the configuration of the baffle plate 44, and may be configured to include the through-hole 46, or may be formed, for example, in a semicircular shape.

In addition, each of the fluid mixing units 3, 7, and 8 described above is not limited to being used such that as described above, the outlet 39 is located on the upper side and the side wall supply port 33 and the bottom wall supply port 34 are located on the lower side, and may be disposed upside down to be used, or may be used laterally. However, since the bubble 101 is easily discharged toward the upper side of the processing container 31 by the baffle plate 4 as described with reference to FIG. 6, it is preferable that as in the example described above, the fluid mixing unit is used such that the outlet 39 is located on the upper side and the side wall supply port 33 and the bottom wall supply port 34 are located on the lower side.

Incidentally, in the fluid mixing unit 3 of the first embodiment, the poor solvent and the raw material liquid are supplied to the first flow space 35 and the second flow space 36 from the lower portion side toward the upper portion side, respectively; however, the poor solvent may be supplied from the upper portion side of the processing container 31 in the first flow space 35. Namely, instead of providing the bottom wall supply port 34, a supply port may be provided in the ceiling portion of the processing container 31, and the poor solvent may be supplied to the first flow space 35 from the supply port of the ceiling portion. Even with such a configuration, since the poor solvent can be highly uniformly supplied from each part of the porous membrane 32 to the second flow space 36 as described above, mixing can be performed such that the concentration of the poor solvent in the raw material liquid flowing through the second flow space 36 increases gradually. Similarly, in the fluid mixing unit 7 of the second embodiment, the supply port for the poor solvent is not limited to being formed in the bottom wall of the processing container 31, and may be formed in the ceiling portion or the side wall.

Incidentally, the baffle plates 4 and 44 may be formed such that only one of the upper inclined surface 43 and the lower inclined surface 42 is provided and the thickness increases as the baffle plates 4 and 44 extend from the open side toward the closed side. In addition, the closing member is not limited to being formed in a plate shape similar to the baffle plates 4 and 44, and may be formed in a block shape having a relatively large thickness. However, it is preferable that the baffle plate is formed in a plate shape, as described above, in order to provide a large number of the baffle plates in the processing container 31 to lengthen the flow path. In addition, the baffle plate and the porous membrane 32 described in each of the embodiments may be separately molded and joined to each other, or may be integrally molded. In addition, the processing container 31 is not limited to having a circular shape, and may have a square shape. In addition, the cylindrical body of the porous membrane 32 is also not limited to having a circular shape, and may have a square shape. Further, the fluid to be mixed in each of the fluid mixing units is not limited to a liquid, and may be a gas.

By the way, a case where in the fluid mixing unit 3 of the first embodiment, each of the Reynolds number of the poor solvent flowing through the first flow space 35 and the Reynolds number of the raw material liquid flowing through the second flow space 36 is, for example, 2,000 or less has been described. When the description is supplemented, the baffle plates 4 described above are provided in the second flow space 36 as described above, but the second flow space 36 referred to here is the second flow space 36 when the second flow space 36 is assumed not to include the baffle plates 4. Namely, when the raw material liquid is supplied in a state where the baffle plates 4 are not provided, the Reynolds number of the raw material liquid in the second flow space 36 is, for example, 2,000 or less. In addition, also in the fluid mixing unit 7 of the second embodiment, each of the Reynolds number of the raw material liquid flowing through the first flow space 35 and the Reynolds number of the poor solvent flowing through the second flow space 36 is, for example, 2,000 or less. In the second embodiment, the baffle plates 44 are provided in the first flow space 35, but the first flow space 35 referred to here is the first flow space 35 when the first flow space 35 is assumed not to include the baffle plates 44. Namely, when the raw material liquid is supplied in a state where the baffle plates 44 are not provided, the Reynolds number of the raw material liquid in the first flow space 36 is, for example, 2,000 or less.

Incidentally, it has to be considered that the embodiments disclosed this time are provided as examples in all aspects and the invention is not limited thereto. Various forms of omissions, substitutions, and changes may be made to the embodiments without departing from the appended claims and concept.

(Evaluation Test)

As an evaluation test, it was confirmed whether or not the mixing of liquids was properly performed using a fluid mixing unit for test having substantially the same configuration as that of the fluid mixing unit 3. Regarding the details of the fluid mixing unit for test, the porous membrane 32 forming the fluid mixing unit has an outer diameter of 6 mm, an inner diameter of 4 mm, and a height of 20 cm. Thirty eight baffle plates 4 were attached at an interval of 5 mm. A thickness L3 (refer to FIG. 2) of the end portion on the closed side of the baffle plate 4 is 2 mm. In addition, the diameter of the baffle plate 4 is 1.96 cm when the diameter is measured while the cutout is avoided. In addition, a width L5 (refer to FIG. 3) of the gap 40 between the baffle plate 4 and the inner wall of the processing container 31 is 2 mm. In addition, in this example, the baffle plate 4 of the baffle plate 4 is made of polytetrafluoroethylene, and the side wall of the processing container 31 is made of a transparent acrylic resin. Incidentally, the baffle plate and the processing container 31 in the embodiments described above may be made of such materials.

Water which is colored by addition of a food coloring (food colored water) was supplied from the bottom wall supply port 34 of such a fluid mixing unit for test at 20 mL/min, and colorless water was supplied from the side wall supply port 33 at 50 mL/min. As a result, it was visually confirmed that the color of the liquid flowing through the second flow space 36 became richer as the liquid flowed from the lower side toward the upper side thereof. Then, the intensities of the color at different positions in a lateral direction were the same at the same height in the second flow space 36. Therefore, it was confirmed that the mixing of the liquids was performed such that the concentration of the food colored water increased as the food colored water approached the upper side of the second flow space 36.

As a comparative test, a test was performed under the same conditions as those of the evaluation test except that the baffle plate 4 was not provided. As a result, it was confirmed that a layer of the colorless liquid was formed to surround a layer of the colored liquid from an outer periphery in the second flow space 36. The thick of the colored layer increased in proportion to the height of the processing container 31. Namely, the food colored water flows highly uniformly into the second flow space 36 from each part of the porous membrane 32, but is not sufficiently mixed. Therefore, from the results of the evaluation test and the comparative test, it was confirmed that as described above, the mixing of the liquids could be well mixed by using the fluid mixing unit 3 of the embodiment.

REFERENCE SIGNS LIST

3, 7, 8 Fluid mixing unit
31 Porous membrane
33 Side wall supply port
34 Bottom wall supply port
35 First flow space
36 Second flow space
39 Outlet
4, 44 Baffle plate

The invention claimed is:
1. A fluid mixing unit comprising:
a container to which a first fluid and a second fluid each are supplied;
a cylindrical body formed of a porous body that partitions an inside of the container into a central flow space and a peripheral flow space surrounding the central flow space, and to allow the fluid to move each way between the central flow space and peripheral flow space;
a first supply port provided in the container to supply the first fluid to said central flow space;
a second supply port provided on one end side of the container in an axial direction of the cylindrical body to supply the second fluid to said peripheral flow space;
an outlet which is provided on an other end side of the container in the axial direction of the cylindrical body so as to be open only to one flow space of said central flow space and said peripheral flow space and from which a mixed fluid of the first fluid and the second fluid flows out; and closing members provided in a plurality of stages along the axial direction that alternately close a right side and a left side of the one flow space relative to the axial direction so as to define a meandering flow path of the first fluid and the second fluid in the one flow space to achieve the mixed fluid;

wherein the one flow space is the peripheral flow space, and the other flow space is the central flow space; and wherein a plurality of the cylindrical bodies formed of the porous bodies are provided to penetrate through each of the closing members.

2. The fluid mixing unit according to claim 1,
wherein the closing member is an annular member surrounding the cylindrical body.

3. The fluid mixing unit according to claim 2,
wherein a part of a side wall of the annular member is separated from an inner wall of the container to form a gap between the part of the side wall and the inner wall, the gap forming a flow path portion of the meandering flow path.

4. The fluid mixing unit according to claim 3,
wherein as seen in the axial direction, the peripheral flow space is formed in an annular shape, and the annular member is formed in an annular shape with a straight edge portion along a portion of a circumference of the annular member.

5. The fluid mixing unit according to claim 1,
wherein for each one closing member of said closing members one side of a right side and a left side is an open side which does not close the one flow space, and an other side of the right side and the left side is a closed side which closes the one flow space, a thickness of said one closing member increasing along a direction from the open side toward the closed side.

6. A fluid mixing unit comprising:
a container to which a first fluid and a second fluid each are supplied:
a cylindrical body formed of a porous body that partitions an inside of the container into a central flow space and a peripheral flow space surrounding the central flow space, and to allow the fluid to move each way between the central flow space and peripheral flow space:
a first supply port provided in the container to supply the first fluid to said central flow space:
a second supply port provided on one end side of the container in an axial direction of the cylindrical body to supply the second fluid to said peripheral flow space;
an outlet which is provided on an other end side of the container in the axial direction of the cylindrical body so as to be open only to one flow space of said central flow space and said peripheral flow space and from which a mixed fluid of the first fluid and the second fluid flows out; and
closing members provided in a plurality of stages along the axial direction that alternately close a right side and a left side of the one flow space relative to the axial direction so as to define a meandering flow path of the first fluid and the second fluid in the one flow space to achieve the mixed fluid; and
in which each one stage of the plurality of stages comprises a discrete annular member as the corresponding closing member, in which the container and cylindrical body extend longitudinally in an axial direction, and wherein the discrete annular member extends transverse to the axial direction and is in contact with the cylindrical body along a 360 degree outer wall circumference of the cylindrical body.

7. The fluid mixing unit of claim 6, wherein the discrete annular member is in contact with the container along less than a 360 degree circumference of an inner wall of the container.

8. The fluid mixing unit of claim 6, wherein the each one closing member of said closing members has a first inclined surface facing a first end of the container and extending toward the closed side, and a second inclined surface facing a second end of the container opposite the first end and extending toward the closed side, said each one closing member having a thickness increasing along a direction from an open side toward the closed side of the one flow space.

9. A fluid mixing unit comprising:
a container to which a first fluid and a second fluid each are supplied:
a cylindrical body formed of a porous body that partitions an inside of the container into a central flow space and a peripheral flow space surrounding the central flow space, and to allow the fluid to move each way between the central flow space and peripheral flow space:
a first supply port provided in the container to supply the first fluid to said central flow space:
a second supply port provided on one end side of the container in an axial direction of the cylindrical body to supply the second fluid to said peripheral flow space;
an outlet which is provided on an other end side of the container in the axial direction of the cylindrical body so as to be open only to one flow space of said central flow space and said peripheral flow space and from which a mixed fluid of the first fluid and the second fluid flows out; and
closing members provided in a plurality of stages along the axial direction that alternately close a right side and a left side of the one flow space relative to the axial direction so as to define a meandering flow path of the first fluid and the second fluid in the one flow space to achieve the mixed fluid; and
further comprising:
a raw material unit that supplies raw material liquid containing fine crystals of a target substance as one fluid of the first fluid and the second fluid, and in which the raw material unit is connected to one of the first supply port and second supply port corresponding to said one fluid;
a poor solvent supply unit that supplies poor solvent as another fluid of the first fluid and the second fluid, and in which the poor solvent unit is connected to an other of the first supply port and the second supply port; and
an aging pipe connected to the outlet and which precipitates first crystals of the fine crystals of the target substance.

10. The fluid mixing unit of claim 9, wherein the each one closing member of said closing members has a first inclined surface facing a first end of the container and extending toward the closed side, and a second inclined surface facing a second end of the container opposite the first end and extending toward the closed side, said each one closing member having a thickness increasing along a direction from an open side toward the closed side of the one flow space.

11. A fluid mixing unit comprising:
a container to which a first fluid and a second fluid each are supplied;
a cylindrical body formed of a porous body that partitions an inside of the container into a central flow space and a peripheral flow space surrounding the central flow space, and to allow the fluid to move each way between the central flow space and peripheral flow space;

a first supply port provided in the container to supply the first fluid to said central flow space;

a second supply port provided on one end side of the container in an axial direction of the cylindrical body to supply the second fluid to said peripheral flow space;

an outlet which is provided on an other end side of the container in the axial direction of the cylindrical body so as to be open only to one flow space of said central flow space and said peripheral flow space and from which a mixed fluid of the first fluid and the second fluid flows out; and closing members provided in a plurality of stages along the axial direction that alternately close a right side and a left side of the one flow space relative to the axial direction so as to define a meandering flow path of the first fluid and the second fluid in the one flow space to achieve the mixed fluid; and wherein each one closing member of said closing members has a first portion extending in a transverse direction from a closed side of said left side and right side of the one flow space, and each one closing member has a second portion extending from the first portion toward an open side of said left side and right side of the one flow space;

wherein said first portion has a first surface facing a first end of the container and has a second surface facing a second end of the container opposite the first end;

wherein said second portion has a first inclined surface in connection with the first surface of the first portion and is inclined relative to the first surface, the first inclined surface extending from the first portion to an end of the closing member at the open side of the one flow space;

wherein said second portion has a second inclined surface in connection with the second surface of the first portion and is inclined relative to the second surface, the second inclined surface extending from the first portion to the end of the closing member at the open side of the one flow space; and wherein the thickness of the second portion decreases along the second portion toward the open side of the one flow space.

12. The fluid mixing unit according to claim 11, wherein the cylindrical body formed of the porous body is one of a plurality of cylindrical bodies formed respectively of porous bodies provided to penetrate through each one of the closing members.

13. The fluid mixing unit according to claim 11, wherein the one flow space is the peripheral flow space, and an other flow space is the central flow space.

* * * * *